United States Patent [19]

Meadows et al.

[11] Patent Number: 5,432,428
[45] Date of Patent: Jul. 11, 1995

[54] WIDE BAND CONSTANT CURRENT SOURCE FOR USE IN BATTERY CHARGERS

[75] Inventors: Vernon Meadows, Coral Springs; Jose M. Fernandez, Plantation, both of Fla.

[73] Assignee: Motorola, Inc., Schaumburg, Ill.

[21] Appl. No.: 176,993

[22] Filed: Jan. 3, 1994

[51] Int. Cl.⁶ .................... H01M 10/44; H01M 10/46
[52] U.S. Cl. ......................................... 320/20; 320/21
[58] Field of Search .................. 320/20, 21, 22, 32

[56] References Cited

U.S. PATENT DOCUMENTS

| | | | |
|---|---|---|---|
| 3,538,415 | 11/1970 | Wilson | 320/32 |
| 3,852,652 | 12/1974 | Jasinski | 320/35 |
| 5,122,722 | 6/1992 | Goedken et al. | 320/22 |
| 5,177,427 | 1/1993 | Bugaj | 320/20 |
| 5,184,059 | 2/1993 | Patino et al. | 320/15 |
| 5,345,162 | 9/1994 | Shoiojima | 320/21 |
| 5,363,030 | 11/1994 | Ford et al. | 320/13 |
| 5,371,453 | 12/1994 | Fernandez | 320/5 |

*Primary Examiner*—Thomas M. Dougherty
*Assistant Examiner*—Nicholas Ponomarenko
*Attorney, Agent, or Firm*—Kenneth M. Massaroni

[57] ABSTRACT

A battery charger (100) with an improved wide band, constant current source (10) with improved dynamic range is provided. The wide band constant current source (10) with improved dynamic range may include a current source (22), a voltage reference amplifier (50), a current control network (70) and overcurrent control circuit (80).

10 Claims, 3 Drawing Sheets

WIDE BAND CONSTANT CURRENT SOURCE FOR USE IN BATTERY CHARGERS

TECHNICAL FIELD

This invention relates in general to the field of secondary battery charging devices, and more particularly, to battery charging devices having current sources.

BACKGROUND

There has been a great deal of interest in developing better and more efficient methods for storing energy for applications such as radio communication, satellites, portable computers, and electric vehicles, to name but a few. Accordingly, there have been recent concerted efforts to develop high energy, cost effective battery cells having improved performance characteristics.

Rechargeable, or secondary cells are more desirable than primary (non-rechargeable) cells since the associated chemical reactions which take place at the positive and negative electrodes of the battery are reversible. Electrodes for secondary cells are capable of being regenerated (i.e., recharged) many times by the application of an electrical charge thereto. Numerous advanced battery systems have been developed for storing electrical charge. Concurrently, much effort has been dedicated to the development of electrical battery chargers adapted to apply charging currents to these various battery systems.

As electrochemical cell chemistry became more complex, design and fabrication of complementary battery chargers did so likewise. As a result, present day, state-of-the-art battery chargers typically have many electronic components, which contribute to potential device failure. Further, increased component count yields increased circuit complexity, further adding to potential failure.

In the past, typical constant current sources for off-line battery charging devices used standard digital-/analog amplifiers to select between different constant currents. This approach, while valid, required the use of numerous electronic components, and complex algorithms to select the digital output from a microcontroller, and hardware equivalent circuitry. Further, the prior art approach also imposed a threshold voltage below which operation was impracticable. Accordingly, a wide-band constant current control circuit having a "rail-to-rail" dynamic range was not possible. An example of this type of prior art device is illustrated in FIG. 1.

FIG. 1 illustrates a prior art current control circuit 10, including an amplifier 12, having the output electrically coupled a bipolar transistor 16, via resistor 18. The bipolar transistor 16 is electrically coupled with, and provides signals to an opto-coupler 19. The bipolar transistor 16 may be, for example, an NPN transistor. It is well-known by those of ordinary skill in the art that it is necessary to provide a bias of approximately 0.6 Vdc at the base of a bipolar transistor in order to ensure operation. In designing a constant current source having a dynamic range of, for example, between 0.1 and 2 amps, it becomes apparent that it is difficult to control bias of the circuit below 0.6 Vdc on the transistor. If a ratio of one-to-one between the reference voltage and current exists, it is only possible to control the current between approximately 600 ma and 2 amps. Current control is lost at currents below about 600 ma. Accordingly, it is difficult to control the opto-coupler 19 at currents below about 600 ma. It is possible to change the control ratio in order to address this problem, however, other limitations in the electrical control of the circuit are then introduced. These limitations include non-linearity in current control, and minimal overall current range control.

Accordingly, there exists a need to provide a wide band constant current source for use in a rechargeable battery charging device. Such an improved battery charger should minimize parts count, minimize circuit complexity, and provide for improved dynamic current range.

SUMMARY OF THE INVENTION

Briefly, according to the invention, there is provided a wide band, constant current source for a battery charger for secondary electrochemical cells. The wide band, constant current source includes a first resistor electrically coupled to a power source. The first resistor is also electrically coupled to a first amplifier. The first resistor and amplifier are adapted to function as a current control monitor. Further, the output of the first amplifier is electrically coupled to a "shut down" transistor adapted to ensure that no current is set on the wide band, constant current source prior to start-up of the device. The "shut down" transistor may be a conventional bipolar transistor.

The wide band constant current source further includes a second amplifier having a MOSFET connected to the output thereof. The amplifier's first input is electrically coupled to the current control monitoring resistor and amplifier, and the transistor. The second input of the second amplifier is electrically coupled to a digital-to-analog microcontroller adapted to provide a reference voltage to the system.

The wide band, constant current source may further include an opto-coupler operatively associated with said MOSFET. The opto-coupler is connected to one output of the MOSFET, and may be a light emitting diode which reacts to electrical impulses from said MOSFET. The LED may provide light pulses to an opto-coupler transistor, such as a NPN transistor.

DETAILED DESCRIPTION OF THE PREFERRED EMBODIMENT

Figure 1:
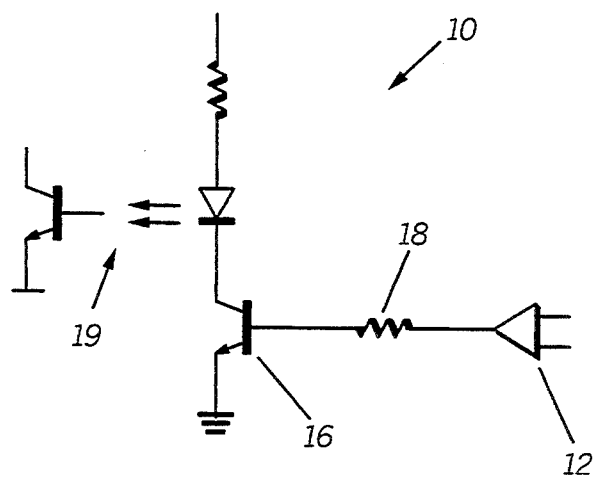
FIG. 1 is a circuit diagram illustrating a prior art constant current controller.

While the specification concludes with claims defining the features of the invention that are regarded as novel, it is believed that the invention will be better understood from a consideration of the following description in conjunction with the drawing figures, in which like reference numerals are carried forward.

Figure 2:
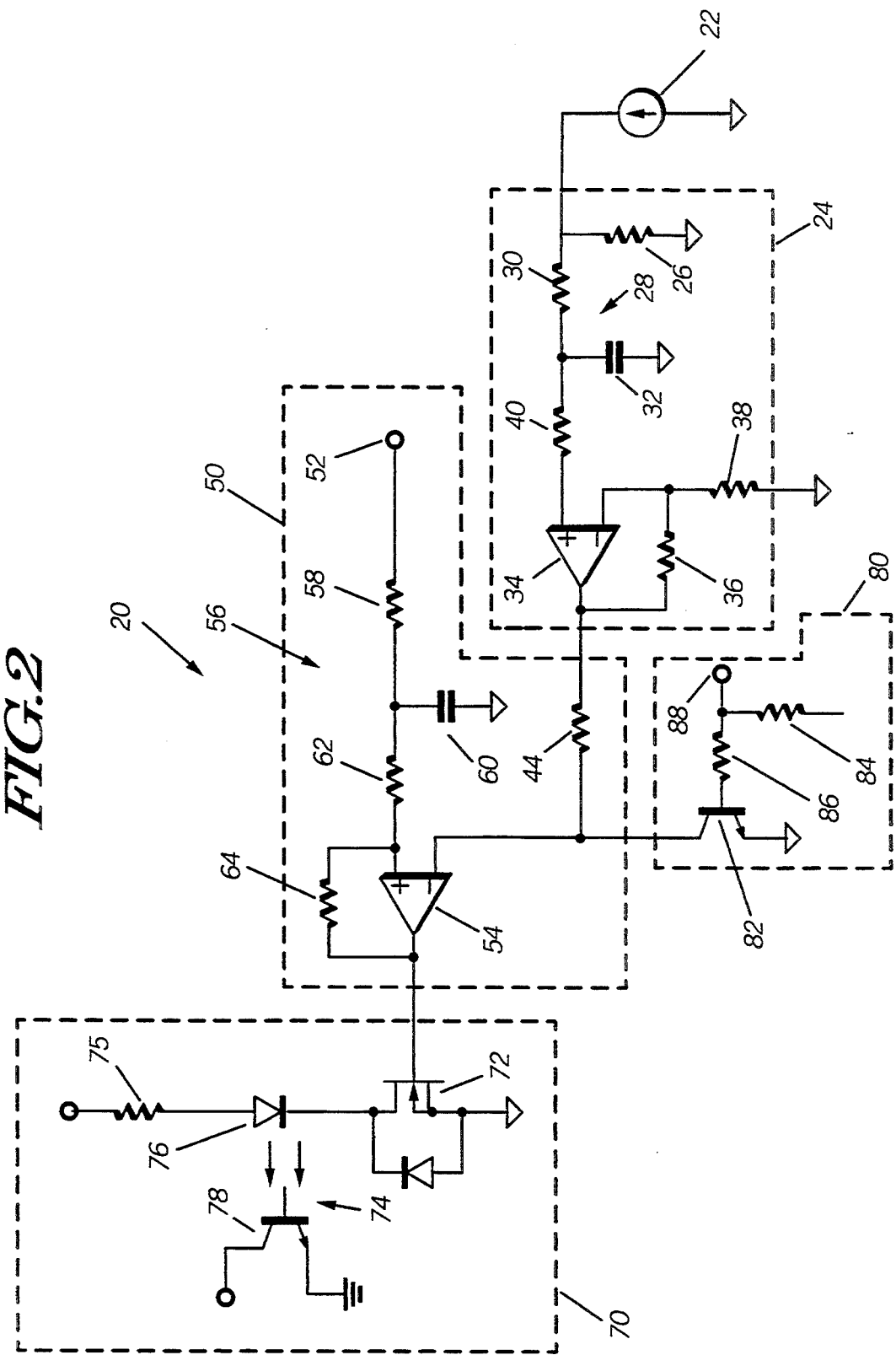
FIG. 2 is a circuit diagram illustrating a wide band constant current source, having improved dynamic range, in accordance with the invention.

Referring now to FIG. 2, there is illustrated therein a circuit diagram of a wide band, constant current source 20 in accordance with the instant invention. The constant current source 20 includes a current source 22.

The current source 22 provides a current to a current sensing amplifier network illustrated in box 24. The current sensing amplifier network 24 includes current sensing resistor 26 which is typically low impedance to allow for minimal power dissipation. The signal developed by the current sensing resistor 26, is then filtered through an RC filter 28 consisting of resistor 30, and capacitor 32. Filtering through the RC filter 28 is desirable in order to minimize noise caused by the operating frequency of the power source.

The filtered signal is then amplified via an operation amplifier 34. The output of operation amplifier 34 is connected to a feedback network including resistors 36 and 38. The feedback network provides gain for the current sensing amplifier network 24. An additional resistor 40, is provided between operation amplifier 34 and the RC filter 28, and is provided to balance the input signal from the current sensing resistor 26.

The wide band constant current source 20 further includes a voltage reference amplifier system illustrated in box 50, which receives an output signal from the current sensing amplifier network 24 via resistor 44, using that output signal to drive a current control network illustrated in box 70. The voltage reference amplifier system 50 includes a micro-computer digital/analog port 52, which sets a reference voltage on the reference amplifier 54. The reference voltage signal provided at part 52 may be provided by, for example, a microprocessed (not shown). An RC filter 56 consisting of resistor 58 and capacitor 60 provides smoothing and filtering capabilities from a signal delivered by port 52. A feedback network consisting of resistors 62 and 64 is used to set the gain for the reference amplifier 54. The reference voltage set by the port 52 may be such that a one-to-one ratio between voltage and current is accomplished. For example, one volt reference voltage at 400 milliamps would mean the current sensing resistor 26 has one amp passing through it.

Output from the voltage reference amplifier system 50 is used to drive the current control network 70. The current control network 70 consists of a metal oxide semiconductor field effect transistor (MOSFET) 72, an opto-coupler 74, and a current limiting resistor 75. The MOSFET 72 is driven by the voltage reference amplifier system 50, and is electrically coupled to the output of reference amplifier 54. The opto-coupler 74 further comprises a light emitting diode 76, and a transistor 78, as for example a bipolar transistor. The output signal from the voltage reference amplifier system 50 drives MOSFET 72 in such a manner so as to allow the forward conduction of diode 76 and activation of the transistor 78. This results in transistor 78 being driven towards saturation. The opto-coupler signal is then distributed to a power conversion circuit (illustrated in FIG. 3) which ultimately feeds back to current sensing resistor 26. Thus, the MOSFET 72 acts as a potentiometer by means of adjusting the output drive in the reference amplifier 50. This current control network 70 arrangement allows the control loop to provide minimal impedance at the MOSFET 72, while providing a wide band dynamic range of current sourcing capabilities.

During start-up conditions, i.e. when the battery charging device into which the instant wide band constant current source is integrated is first turned on, the digital/analog converter port 52 requires a means to ensure that over-current does not occur. Accordingly, an over-current shutdown circuit illustrated in box 80 is provided, and ensures that the reference amplifier 50 does not drive MOSFET 72 into full saturation. Should the MOSFET 72 become fully saturated, current potentials at startup will result. Current potentials at startup result in potential damage to battery charging device due to over current stresses on the components.

The over current shutdown circuit 80 includes a transistor 82 which is used to sink the current amplifier's output signal by biasing the transistor 82 with resistors 84 and 86. Once startup has occurred, a micro-processor input/output 88 will drive the transistor 82 out of saturation, allowing for normal operation. The over-current shutdown circuit 80 is electrically coupled to both the voltage reference amplifier system 50 and the current sensing amplifier network 24.

Figure 3:
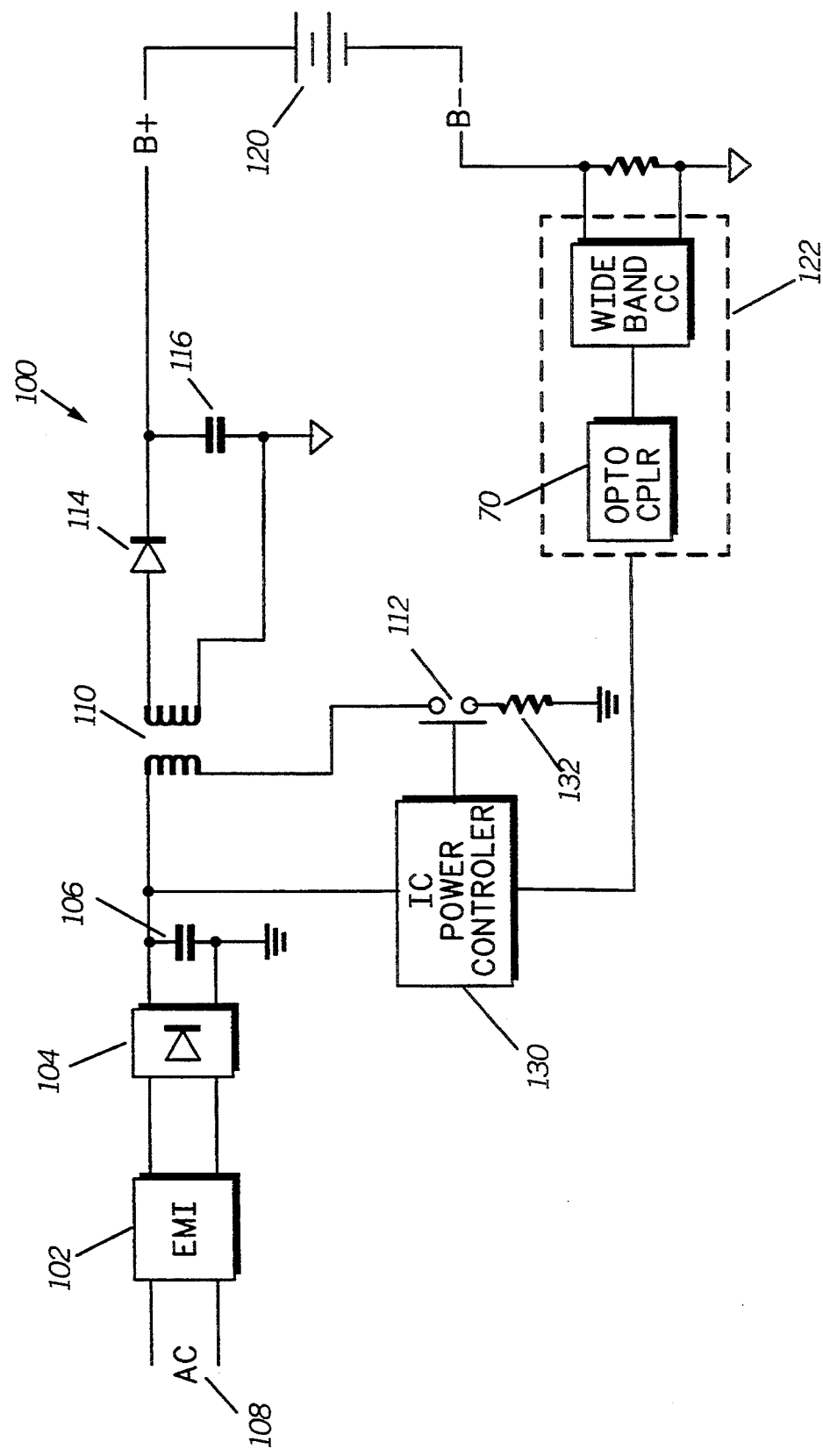
FIG. 3 is a block diagram of a battery charging device in accordance with the invention.

Referring now to FIG. 3, there is illustrated therein a block diagram of a battery charging device in accordance with the instant invention. Battery charging device 100 consists of an electromagnetic interference filter 102 coupled to a full bridge rectifier 104, and filtered by a capacitor 106. This arrangement of components is provided to minimize switching noise, rectify the AC line signal, and filter high voltage D.C. The filter 102, rectifier 104, and capacitor 106 are interposed between an AC current source 108 and a switch transformer 110. A high DC signal is received by the switch transformer 110 and switch means 112. The switch 112 opens and closes in response to a pulse width modulator, integrated circuit 130 (PWMIC) which is, in turn, controlled by the opto coupler 70.

A secondary voltage is then developed between an output rectifier 114 and an output capacitor 116. The output rectifier and output capacitor are provided to rectify and filter the transformed switching pulses. The output signal developed from the output rectifier and output capacitor is then sent through a secondary rechargeable battery 120 and is monitored by the sensor resistor 26 of FIG. 2.

The wide band constant current source of FIG. 2, including the current sensing amplifier network 24, the voltage reference amplifier system 50, and the overcurrent shutdown circuit 80 are illustrated in FIG. 3 as the wide band constant current source of box 122. The current control network 70 of FIG. 2 is also included in box 122.

Current is controlled in the battery charging device 100 via the wide band constant current source described in FIG. 2. The wide band constant current source 122 locks in a constant current at the PWMIC. Resistor 132 connected to switch 112 is provided for overcurrent protection on the supply side of the battery charging device.

Comparative Results

Figure 4:
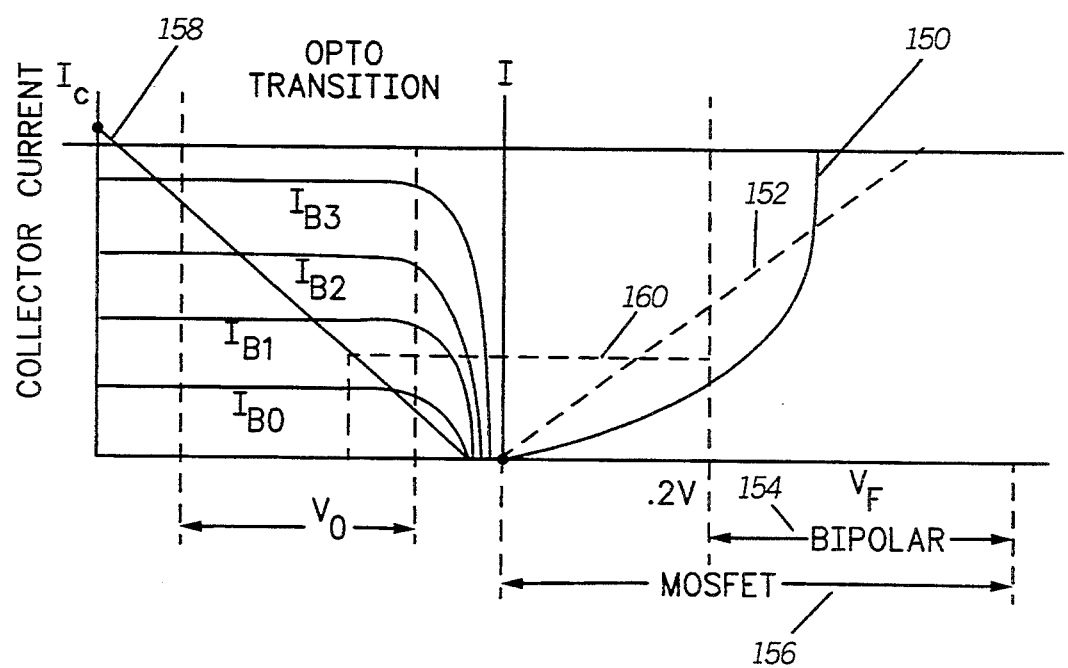
FIG. 4 is a current versus voltage diagram illustrating the performance characteristics of a wide band constant current source in accordance with the invention.

Referring now to FIG. 4, there is illustrated therein an IV graph, provided to illustrate the performance differential between a constant current source of the prior art as compared to the wide band constant current source in accordance with the instant invention.

In order to achieve full dynamic ranges in an off-line constant current source switching power supply, linearity must be achieved. By this it is meant that as current increases, voltages also increases by a uniform portional amount. Prior art battery charging devices typically suffer from low current/voltage resolution because of a lack of linearity. Instability and loss of low end resolution occasioned by a lack of linearity occurred due to compression caused by linearities in the control loop.

Line 150 of FIG. 4 illustrates the output performance of the light emitting diode 76 of FIG. 2. Line 152 illustrates the linear approximation of the output performance of MOSFET 72 of FIG. 2. The performance of the prior art bipolar transistor is described by the region of operation illustrated as region 154. As illustrated, it may be appreciated that the bipolar transistor will only operate above approximately 0.2 volts. Conversely, the region of operation afforded by MOSFET 72 of FIG. 2, and in fact goes down to approximately 0 volts. This region of operation is illustrated as 156 of FIG. 4.

On the left hand side of the chart illustrated in FIG. 4, are a series of curves $I_{b0}$, $I_{b1}$, $I_{b2}$, and $I_{b3}$ which define four currents collected at the base of bipolar transistor 78 off FIG. 2. The output load from the transistor is illustrated as line 158. From these lines, it can be understood that accurate control of transistor 78 of FIG. 2 is lost in the region defined by box 160 of FIG. 4 with a prior art bipolar transistor. Conversely, with the improved device of the instant invention, it is possible to afford a wide dynamic range and hence control not possible with the prior art device.

By using a MOSFET 72 of FIG. 2, full dynamic range can be realized. FIG. 4 illustrates that use of a bi-polar transistor limits the dynamic range of the battery charging device due to its natural, inherent saturation voltage of approximately 0.2 volts. Having achieved the saturation voltage causes the output transistor of the optic coupler to be limited in its overall range, while use of the MOSFET as disclosed in connection with discussion of FIG. 2, increases dynamic range on the output driver.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A wide band, constant current source for a battery charger, said current source comprising:

current control monitoring means including an amplifier and a first resistor operatively connected to a power source;

means for insuring that no current is set prior to start-up of said power source, said insuring means including a transistor, and current control means including an amplifier and a MOSFET in electrical communication with the output of said amplifier, the first input of said amplifier in electrical communication with said current control monitoring means and said insuring means, and the second input of said second amplifier in electrical communication with a reference voltage generator.

2. A constant current source as defined in claim 1, wherein said current control means further includes an opto-coupler operatively communicating with said MOSFET.

3. A constant current source as defined in claim 1, wherein said reference voltage generator includes a digital-to-analog microcontroller.

4. A constant current source as defined in claim 1, wherein said amplifier in said current control means includes a dynamic range gain control.

5. A constant current source as defined in claim 2, wherein said opto-coupler includes a light emitting diode in electrical communication with said MOSFET.

6. A device for charging a rechargeable electrochemical cell, said charging device comprising:

a power source for supplying an electrical charge to said rechargeable electrochemical cell; and a wide-band constant current source comprising current control monitoring means including an amplifier and a first resistor, an over-current shut-down circuit, a voltage amplifier system including an amplifier, and a MOSFET in electrical communication with the output of said amplifier, the first input of said amplifier in electrical communication with said current control monitoring means and said insuring means, and the second input of said second amplifier in electrical communication with a reference voltage generator.

7. A battery charging device as in claim 6 wherein said current control means further includes an opto-coupler operatively communicating with said MOSFET.

8. A battery charging device as in claim 6, wherein said reference generator includes digital/analog microcontroller.

9. A battery charging device as defined in claim 6, wherein said amplifier in said current control means includes a dynamic range gain control.

10. A battery charging device as defined in claim 7, wherein said opto-coupler includes a light emitting diode in electrical communication with said MOSFET.

* * * * *